United States Patent
Schoen et al.

(10) Patent No.: US 8,055,572 B2
(45) Date of Patent: Nov. 8, 2011

(54) ANONYMOUS TRADING SYSTEM

(75) Inventors: John Edward Schoen, New York, NY (US); Nasir Ahmed Zubairi, London (GB); Edward R. Howorka, Morris Plains, NJ (US); Neena Jain, South Plainfield, NJ (US)

(73) Assignee: EBS Group Limited, London (GB)

( * ) Notice: Subject to any disclaimer, the term of this patent is extended or adjusted under 35 U.S.C. 154(b) by 611 days.

(21) Appl. No.: 10/532,968

(22) PCT Filed: Oct. 21, 2003

(86) PCT No.: PCT/US03/33149
§ 371 (c)(1), (2), (4) Date: Nov. 17, 2005

(87) PCT Pub. No.: WO2004/070517
PCT Pub. Date: Aug. 19, 2004

(65) Prior Publication Data
US 2006/0259391 A1   Nov. 16, 2006

Related U.S. Application Data (60) Provisional application No. 60/421,795, filed on Oct. 29, 2002.

(51) Int. Cl.
*G06Q 40/00* (2006.01)
(52) U.S. Cl. .................. 705/37; 705/38; 705/39
(58) Field of Classification Search ............... 705/36 R, 705/37, 39, 38
See application file for complete search history.

(56) References Cited

U.S. PATENT DOCUMENTS

| | | | | |
|---|---|---|---|---|
| 5,136,501 A | * | 8/1992 | Silverman et al. | 705/37 |
| 5,375,055 A | | 12/1994 | Togher et al. | |
| 6,012,045 A | | 1/2000 | Barzilai et al. | |
| 6,317,727 B1 | * | 11/2001 | May | 705/36 R |
| 6,421,653 B1 | | 7/2002 | May | |
| 6,519,574 B1 | * | 2/2003 | Wilton et al. | 705/35 |
| 7,634,438 B2 | * | 12/2009 | Penney | 705/36 R |
| 7,991,683 B2 | * | 8/2011 | Setz | 705/37 |
| 2002/0035534 A1 | * | 3/2002 | Buist et al. | 705/37 |
| 2002/0091617 A1 | * | 7/2002 | Keith | 705/37 |
| 2002/0091624 A1 | * | 7/2002 | Glodjo et al. | 705/37 |
| 2003/0009421 A1 | * | 1/2003 | Bansal et al. | 705/39 |
| 2003/0018561 A1 | * | 1/2003 | Kitchen et al. | 705/37 |
| 2007/0239591 A1 | * | 10/2007 | May | 705/37 |

FOREIGN PATENT DOCUMENTS

| | | | |
|---|---|---|---|
| EP | 0411748 | * | 2/1991 |
| GB | 2 363 876 A | | 6/2000 |
| WO | WO-01/59661 | | 8/2001 |

OTHER PUBLICATIONS

Financial Markets IT/FT press clipping dated Jun. 3, 2002.
Citibank Press Release: Instinet and Citibank Announce Strategic Alliance to Create the Instinet FX Cross. May 20, 2002, New York.
International Search report issued in the parent PCT application.

\* cited by examiner

*Primary Examiner* — Charles Kyle
*Assistant Examiner* — Edward Baird
(74) *Attorney, Agent, or Firm* — Dickstein Shapiro LLP (57) ABSTRACT

An anonymous computerised trading system matches orders by conducting auctions at specified times. As well as entering orders, participants assign credit limits for the duration of the auction, thus minimizing the time for which credit is allocated to the system.

43 Claims, 4 Drawing Sheets

Bank A buys 100M USD/EUR from Bank D by lending of bilateral credit line between B and C

|  | Bank A (M €) | Bank B (M €) | Bank C (M €) | Bank D (M €) |
|---|---|---|---|---|
| Bank A | - | 100 | 0 | 0 |
| Bank B | 100 | | 100 | 0 |
| Bank C | 0 | 100 | | 100 |
| Bank D | 0 | 0 | 100 | |

ANONYMOUS TRADING SYSTEM

CROSS REFERENCE TO RELATED APPLICATIONS

This application is a National Stage filing under 35 U.S.C. 371 of International Application No. PCT/US03/33149, filed on Oct. 21, 2003, which designated the United States and which was in the English language, and claims priority benefit from U.S. Provisional Application No. 60/421,795, filed on Oct. 29, 2002.

This invention relates to anonymous trading systems for trading fungible instruments. It is particularly concerned with auction based trading systems.

Anonymous trading systems are used widely to trade fungible instruments, particularly financial instruments such as foreign exchange (FX) products. These systems have been very successful and are used for the majority of transactions in some instruments, for example FX spot.

As their name suggests, anonymous trading systems do not allow the participants to know the identity of potential counterparties to a transaction until the trade has been confirmed. One well known system operated by EBS Dealing Resources Inc, and described in EP-A-625275, requires traders to input quotes in the forms of bids and offers into the system via their trader terminals. These quotes are matched with other quotes in the system by a matching engine or arbitrator. Where a match is found, a deal will be executed between the parties, once it has been established that each party has sufficient credit with the other for the deal. A market distributor is arranged between the arbitrator and a bank node, at which is a credit matrix indicative of credit assigned by a bank to all counterparties on the system. The market distributor is responsible for constructing a market view for each trading floor based on their credit as represented by the binary credit matrix stored at the market distributor. Thus, traders at a given trading floor are only shown quotes input into the system by parties with whom they have credit. The actual credit limits are stored at bank nodes in the EP-A-625275 system.

Rather than waiting for the matching engine to match visible orders input into the system, traders can input invisible hit and take orders which are on offer to sell or buy a quote at the price and for the amount of the offer.

Once a deal has been concluded, details of the trade, including the identity of the parties and the price at which the deal was concluded, are distributed to all trading floors. Thus, the system is no longer anonymous once deals have been completed.

This type of system has been highly successful and is most useful for trading regular amounts of an instrument. However, it is not ideal for trading large amounts outside the regular trading range. If one considers the example of FX Spot a typical deal amount is between $1M and $5M ($1 to 5 million). If a bank needs to trade a large amount, for example $50M, it is very unlikely to find a single party willing to trade the whole amount. Instead, a number of separate trades, each probably in the range of $1M to $5M will be concluded. While this order is being filled, the traders' screen will show details of the deals so far concluded. They will see a string of deals all showing the party with the $50M quote on the same side of the deal. The market will conclude that there is a party who needs to buy or sell a large amount of currency and adjust their prices accordingly to the detriment of the party with the large amount to buy or sell.

There is therefore a need for a system which facilitates the trading of large amounts of an instrument without prejudicing the ability of the trading party to achieve optimum market prices.

A further disadvantage with trading large amounts of existing systems relates to credit limits. In a system such as the EBS system mentioned above, each trading floor allocates credit to each other counterparty on the system. These credit limits are typically updated on a daily basis. The credit assigned to that particular trading system may be allocated from the financial institution's overall credit pool for all its trading activities. Thus, credit assigned to the anonymous trading system cannot be used for other trading activities and if not used on the trading system represents lost revenue opportunities for the institution. If an institution wants to trade large amounts for example $50M in the FX spot example, it must reserve correspondingly large amounts of credit to likely counterparties on the anonymous trading system. This is a high credit overhead which may reduce the institutions overall trading capacity. Some institutions choose not to reserve credit they assign to various trading activities. However, this runs the risk of exceeding overall credit limits.

There is, therefore, a need for a trading method and system which allows large amounts of an instrument to be traded without compromising the institutions overall trading effectiveness by tying up large amounts of credit for long periods of time.

Broadly, in one aspect of the present invention addresses the disadvantages discussed by providing an anonymous auction system in which auctions are held at fixed times and for which credit is allocated before the auction and returned after the auction. In another aspect the invention allows trades to be executed at benchmark prices published at various times.

More specifically there is provided a method of trading a fungible instrument comprising: notifying potential participants of an auction time; receiving from participants orders related to the auction; receiving from participants credit limits for execution of orders input by the participants with other participants; conducting the auction at the time notified to the participants by matching the orders received; notifying the owners of matched orders; and notifying the participants of credit allocated to the auction but not used in matched orders. The invention also provides a method of anonymous computerised trading of fungible instruments comprising: Sending an electronic message to potential participants notifying the participants of an auction time; receiving at a computerised trading system, electronic messages from participants including orders related to the auction; receiving at the computerised trading system, electronic messages including participant credit limits for execution on the computerised trading system of orders input by the participants with other participants; conducting at the computerised trading system the auction at the time notified to the participants by matching the orders received; notifying the owners of matched orders by sending electronic messages to the owners of matched orders; and sending an electronic message to participants who had submitted credit limits notifying those participants of credit allocated to the auction but not used in matched orders.

The invention further provides a computerised trading system for anonymous trading of fungible instruments comprising: an auction administrator for sending electronic messages to potential participants notifying the participants of an auction time; trader terminals at participants for sending to the trading system electronic order messages related to the auction, and electronic credit limit messages setting credit limits for trades on the computerised trading system by the participants with other participants; a store for storing the orders and credit limits received from the participants; a matching engine for conducting at the computerised trading system the auction at the time notified to the participants by matching the orders received; a deal notifier for notifying the owners of matched orders by sending electronic messages to the owners of matched orders; and a credit notifier for sending electronic messages to participants who had submitted credit limits notifying those participants of credit allocated to the auction but not used in matched orders.

Embodiments of the invention have the advantage that credit is only assigned to the auction system for a short time. In a preferred embodiment, credit is assigned no later than a predetermined time before the auction, for example 1 minute, and the participating institution is notified of unused credit a predetermined time almost immediately after the auction, for example 1 minute. Thus the credit needs only be reserved from the trading institution's other activities for a very short time, in this example as little as 2 minutes.

Embodiments of the invention also have the advantage that the auction is anonymous. Details of orders placed in the system by participants are not communicated to other participants. Details of successful matches during the auction are only communicated to the successful parties. Thus, it is not possible for other parties on the system to see that a given party has a large amount to trade.

Preferably, credits limits may be renewed automatically for future auctions on request from a participant. The facilitates participation in the auction process where a participant has regular lines of credit assigned to trading parties.

Preferably, the initial notification of the auction identifies the auction time, the instrument to be auctioned and the minimum order amount. Preferred systems may be used to trade a wide variety of instruments, both financial and non-financial. By setting a minimum amount, the system can be reserved for the trading of amounts greater than a certain value, for example greater than the amounts usually traded on conventional anonymous trading systems.

Preferably, participants can take part in the auction not only by submitting orders but also by making their credit available to third parties to increase the liquidity of the auction market. Such participants submit credit limits for use in matching orders between other participants lacking bilateral credit. Preferably the participant also submits an identification of other participants whose credit limits may be used to match orders entered by the participants. The matching engine can then match orders received from participants who do not have bilateral credit, using the credit of an intermediary having bilateral credit with the participants submitting the matched orders.

The intermediary may comprise a single participant or a chain of intermediary parties, each party in the chain having bilateral credit with adjacent parties in the chain, a first of said chain of intermediary parties having bilateral credit with the participant submitting one side of the matched order and a second of said chain of intermediary parties having bilateral credit with the participant submitting the other side of the matched order. This daisy chaining of credit further increases the liquidity of the auction market thus making it more likely that orders will be matched.

The invention also provides, according to a second aspect, a method of trading a fungible instrument, comprising: fixing benchmarks for the instrument to be traded at intervals during the trading day; receiving from participants orders to trade at a benchmark price; receiving from participants credit limits for execution of orders input by the participants with other participants; matching orders received on the basis of bilateral credit; notifying the owners of matched orders; and executing the matched order when the benchmark price indicated in the order is fixed.

This aspect of the invention has the advantage that orders entered are tied to benchmark prices. This enables them to be matched immediately even though the orders are not executed until the benchmark indicated in the order is fixed. As a result, the trader does not have to wait until the trade takes place at periodic times through the trading day to see that his position is covered. This prevents any rush into the market by traders anxious to cover their positions once the results of an auction become known.

Embodiments of the invention will now be described, by way of example, and with reference to the accompanying drawings, in which.

Referring to the figures, the system embodying the invention to be described is an auction based system. Potential trading parties submit orders into the system and auctions are held at predetermined intervals, for example, once or twice daily. Participants in the auction need only make credit available for the duration of the auction. If it has been reserved, or blocked off, by the institution participating in the auction, but not used in the auction, it can be swiftly made available again to other parts of the institutions' trading systems.

The auction is anonymous but customers submit orders rather than quotes into the system. A quote requires both a price and a quantity. Orders submitted in this embodiment are limit type orders. Thus they are buy or sell orders either at a specified price or better. This greatly increases the chances of a match being made. Thus, there are no bids or offers submitted to the system. At the designated auction time, a matching engine matches the orders entered into the system and notifies the successful parties of the orders that have been executed. No other parties are notified of the successful deals. Unsuccessful orders remain wholly anonymous.

Potential participants are notified of the auction time for a given financial instrument or instruments. For example a USD/EUR spot auction may be held at 2.00 pm London time. Potential participants are invited to submit orders for amounts larger than a pre-defined amount, for example $50M or above. A cut off point of a given time before the auction is set, for example, 1 minute. Orders received after than time will not be considered in the auction.

Orders are matched on the basis of bilateral credit existing between counterparties. Each potential party must submit credit allocation to other counterparties into the system before the auction can take place. Again, this may be required to have been completed a set time before the auction takes place, for example 1 minute.

Once allocated to the auction system, if the party allocating the credit chooses to reserve the credit, the credit may not be used for any other purpose. However, the participants are notified of the results of the auction directly after the auction, for example no later than two minutes after the auction. This allows them to reduce the credit to reflect transactions made during the auction and to unreserve any unutilised credit. Credit is reassigned for each auction. This may be done either by customers submitting fresh credit limits or by reviewing the limits for the previous auction automatically.

Matching may be performed using a matching engine of the type disclosed in EP-A-625275 in which matching is performed by the arbitrator. The matching algorithm in existing anonymous trading system matches on a price, time priority such that if two equally priced orders could be matched, the first order to be submitted is matched. This paradigm is not appropriate for the present auction based system and matching is performed by attempting to give the best price available to a customer based on its bilateral credit whilst attempting to maximise the trading volume and surplus.

For any trading system to operate effectively, there must be liquidity in the market. The lack of credit between possible counterparties has a detrimental effect on liquidity as potential deals cannot be executed. This may be overcome by market participants offering their credit to counterparties by acting as prime brokers. Customers may indicate whether they are willing to trade through a prime broker and whether they are willing to act as a prime broker. Where they act as a prime broker they indicate to the system those customers on whose behalf they are willing to act and the limits for each customer. The manner of this loaning of credit is discussed below.

Figure 1:
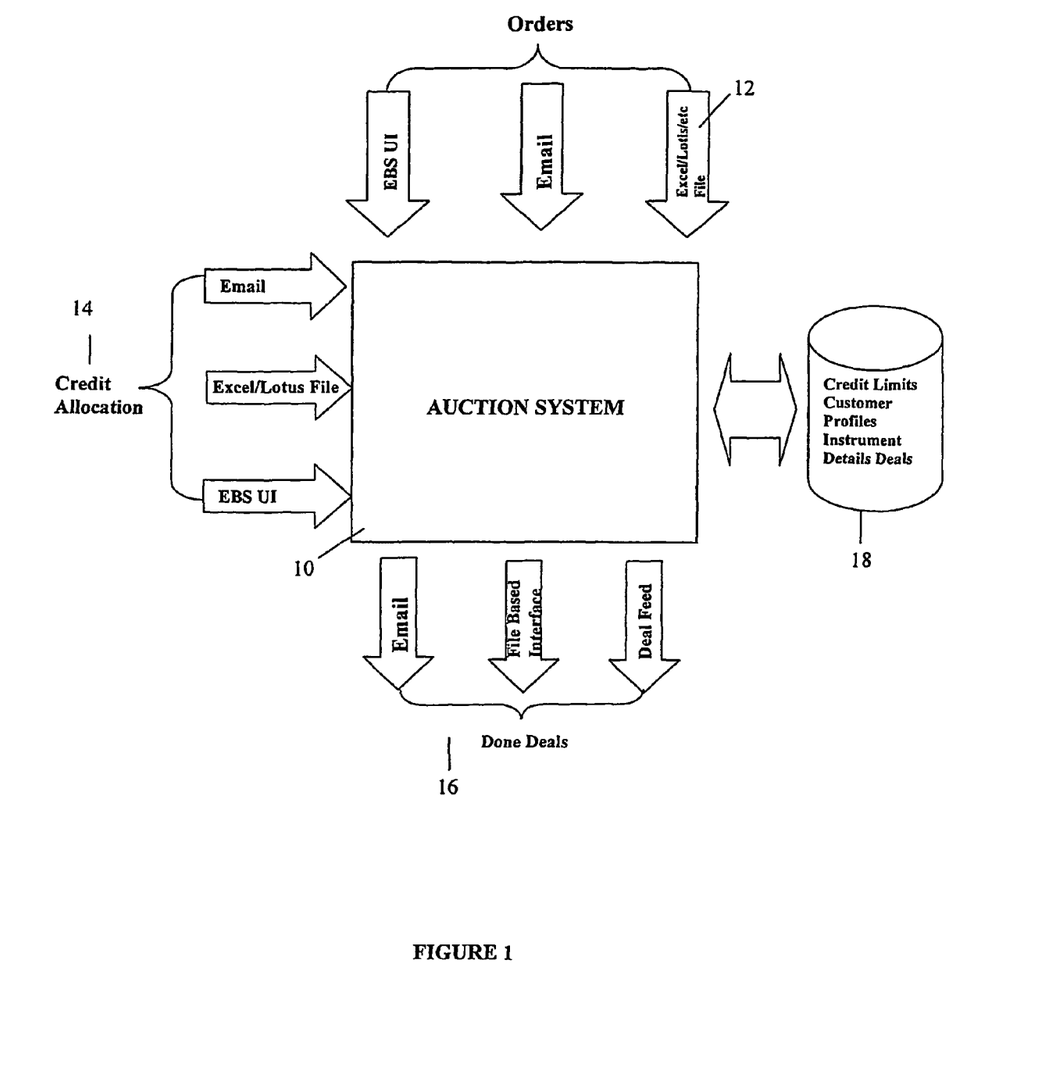
FIG. 1 is a logical view of a system embodying the invention.

FIG. 1 illustrates, schematically, a logical view of the system. The auction system, which comprises a computerised matching engine and a store for credit limits, prime broker credit limits and orders, is illustrated at 10 and receives, for each auction, orders for the auction 12 from customers. These may be received in any form, for example by e-mail or as a spreadsheet file, or in EBS or other user interface format. Other ways of entering the order are possible. Thus, orders are entered into the auction system by an electronic message sent to the auction system by customers and stored by the system until the auction. Similarly credit limits 14 are allocated to the auction system in an electronic message sent to the system by customers and stored until the auction. The credit information may be in any suitable format, such as those mentioned above.

On completion of an auction, the system outputs electronic messages containing information about done deals. These done deal messages 16 are sent by a notifier to the parties to the done deals only and are also in any suitable format. A credit notifier sends electronic messages to participants notifying them of any unused credit with the participants may then unreserve.

The auction system may exchange messages with a database or series of databases 18 which hold information relevant to an auction. This may include the details of the instrument the subject of the auction; credit limits, where these limits are updated automatically from previous auctions; customer profiles, including a willingness to act through or as a prime broker; and a deal log. The databases may be any convenient commercially available databases.

In the embodiment described, the central matching engine in the system may support trading of any financial instrument and details of the instrument are provided from the database 18. Alternatively, the system could be limited to one or a few instruments which are stored on the system.

Figure 2:
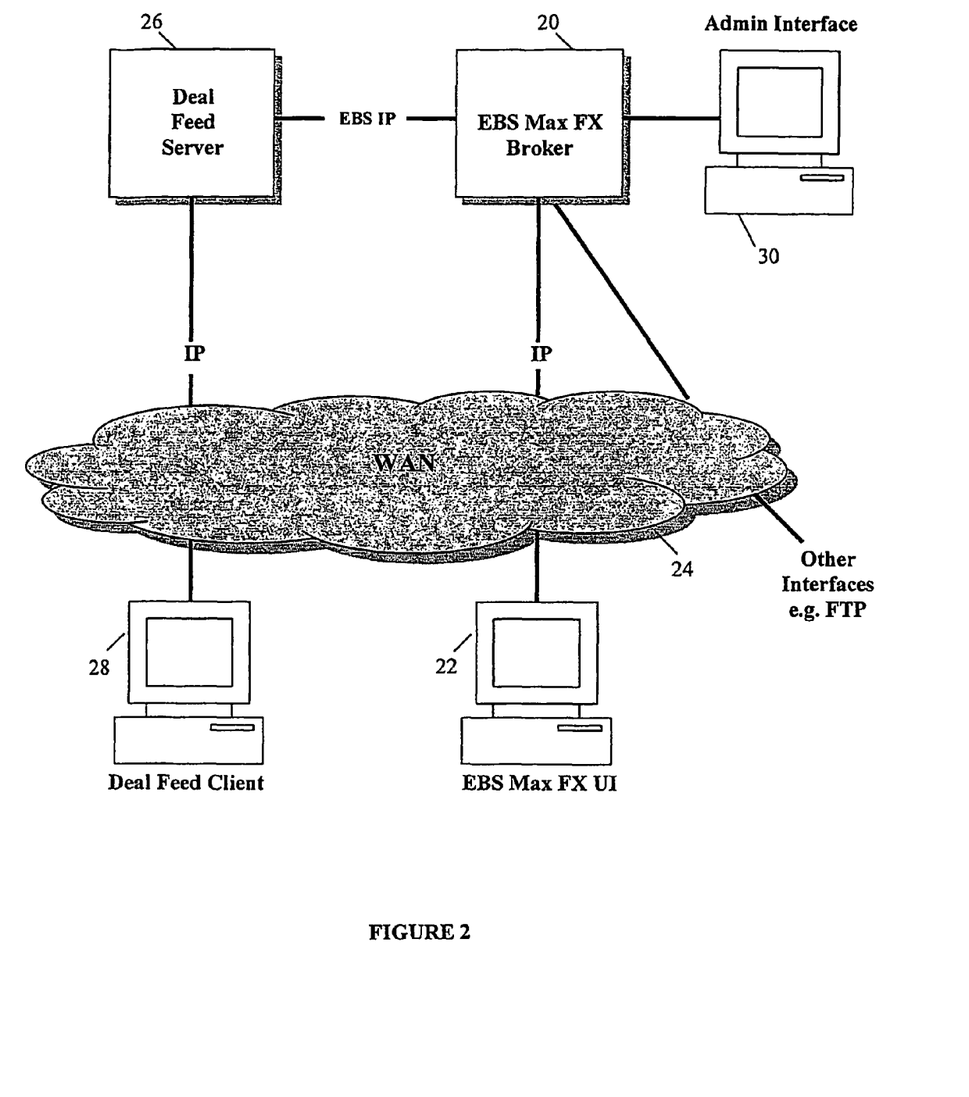
FIG. 2 is a schematic view of a system embodying the invention.

FIG. 2 shows the hardware components of the system. The trading system including the matching system stores and database is shown at 20 and is connected to customers through user interfaces 22. The matching system communicates with the user interfaces 22 via a wide area communications network such as the Internet or a private communications network 24. A single user interface 22 is shown. In practice, there are many interfaces, one per customer or per trader at a customer. Communication with the auction system may be via Internet Protocol (IP) or some other interface such as File Transfer Protocol (FTP). The interface at each customer is provided as a conventional computer workstation.

The auction system 22 also communicates with a deal feed server 26 which receives completed deal information from the auction system 20 on completion of an auction. The server 26 transmits this information over a telecommunications network 24 to a deal feed client 28. Not all parties operating on the system will use the deal feed server. For those that do not, the notifier sends the trader terminal an electronic deal notification message. In practice there will be many deal feed clients. The deal feed clients pass the deal information to back office computer systems at the institutions participating in successful auctions for settlement of the deals that have been made.

As shown in FIG. 1, customers wishing to participate in the auction must notify the auction system of credit limits for various counterparties within the system. These credit limits are specific to the auction system. These limits must be submitted by a predetermined time, for example 1 minute, before the predetermined auction time. Once an auction has taken place, customers may either renew their credit limits automatically, effectively applying the same limits as the previous auction or resubmit fresh limits for a given auction.

In the auction system described, for the system to be viable, it is important that there is sufficient liquidity available. The liquidity is enhanced, in a preferred embodiment of the invention, by allowing customers to lend their credit to one another. As part of the submission of credit limits, as well as indicating how much credit a customer extends to trades with each counterparty, the customer notifies the auction system of credit limits it is willing to lend to various counterparties trading on the system. Again this notification may be in any of the forms discussed above and is made by a predetermined time, such as 1 minute, before the auction takes place. Similarly, customers may notify the system if they are willing to borrow credit from another lender and, if so, how much. Conveniently, these notifications may be sent with the other credit limit notifications.

The orders submitted must be submitted before the cut-off time mentioned above. However, orders may be withdrawn up to a predetermined period before the auction commences, for example 5 seconds. Orders are submitted either as buy or sell orders or both. Although the auction system knows the identity of the participating party, the orders are submitted anonymously and remain anonymous as no other party on the system is made aware of the order. The only exception is the counterparty to a successful auction who is notified of the party which whom they have dealt. This is necessary for settlement purposes. Orders are submitted as limit orders at a specific price or better.

Once the auction time arrives, the auction system matching engine takes all orders that were received before the cut-off time and not subsequently withdrawn, and attempts to match them based on an algorithm that attempts to maximise trading volumes and maximise the surplus. Matching is based on bilateral credit and matches are made to give the best price to the customer either based on its own credit or third party credit if credit has been borrowed.

Once the matching has been completed, all unmatched orders left in the auction are cancelled. The customer is informed of the amount outstanding of each order they posted to the system. The customer can then unreserve assigned credit if appropriate and reduce credit by the amount of the transactions. The auction lasts for a very short time with matching being near-instantaneous.

It will be appreciated, therefore, that credit needs to be allocated, and reserved if this is how a particular institution handles credit, to the auction system for a very short time. If orders are submitted with credit allocating at the last possible time 1 minute before the auction and the participant notified of unutilised credit 1 minute after the auction so that it can be unreserved, the credit has been assigned only for 2 minutes per auction. In practice, the time is likely to be a little longer but is very considerably less than the time for which credit is assigned and reserved to a conventional anonymous trading system.

The matching engine used may be similar to that used in the present system of the applicant referred to in the introduction and disclosed in EP-A-625275 or it may be based as the broker model disclosed in GB-A-2363876. Matching engines are well known to those skilled in the art.

Once the auction has been completed, customers will be notified of deals through one of the interfaces described above with reference to FIG. 1. The deal notification is sent a very short time after completion of the deal, for example, no more than one minute. Where the customer includes a deal feed client, done deals are received from the deal feed server 24 at the deal feed client 26 as described above in relation to FIG. 2.

As the system is completely anonymous, and in contrast to other anonymous trading systems, deals are not reported to the financial markets or incorporated into price feeds supplied to the markets.

As mentioned above, no orders are displayed to customers so that customers cannot see what other prices have been submitted to the system. Nor can they see what deals have been completed. The customer user interface 22 is used simply to input auction data into the system and to receive notifications from the system, for example of auction times and instruments to be auctioned. The customer user interface provides for the following customer functionality:
1. Submission of orders. Multiple orders may be submitted at different prices or different amounts for the same auction;
2. Credit Lending Limits. Customers define credit limits for counterparties to which it is willing to lend credit. These limits define how much trading the counterparty can do in this counter's name;
3. Credit Trading Limits. These define the credit limits for counterparties with which it is willing to trade. The limits define how much trading this customer can do with each counterparty;
4. Credit Borrowing Limits. The customer defines credit limits for lenders from which it is willing to borrow credit;
5. Settlement Instructions. Customers can set up settlement instructions; and
6. Deal Log. Customers may view the deals they have done on the auction system.

FIG. 2 also shows a system administration interface 30 which allows the system administrator to perform administrative functions with respect to the system. The administration interface 30 includes the following functionality:
1. Instrument Definition. The definition of new instruments to be auctioned, and their characteristics, such as the minimum amount to be traded and their price format;
2. Customer Registration. This allows new customers to be registered on the system to participate in auctions;
3. Auction Setting. This allows the times of auctioning to be set at various times in the trading day for various instruments;
4. Customer Profile. Customer profiles may be kept by the administrator and may include a unique identifier, name, contact option (e-mail, file interface etc.), contact information such as e-mail and IP address etc; and
5. Broadcast. This allows the administrator to broadcast certain messages through the system to all customers. Broadcast messages may include auction times, a new instrument or a new customer joining the system. The latter is important as existing customers need to set credit limits for that customer.

The loaning and borrowing of credit will now be described in more detail. In order to increase the liquidity of the auction market, customers can act as prime brokers by lending their credit to other counterparties. They do not have to put orders into the system to participate in the auction and so add liquidity. They merely need to make their credit available. This may be done by automatically renewing credit limits after every auction. There may be multiple prime brokers in the auction system and customers indicate, via their interfaces, if and with whom they are willing to trade through prime brokers. Prime broker customers indicate the customers they are willing to broker for and the credit limit for each customer.

Figure 3:
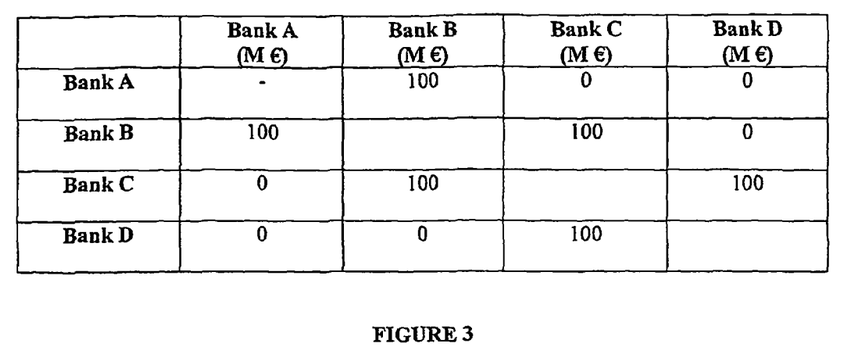
FIG. 3 is a view of credit limits assigned between four banks.

FIG. 3 shows a simple example of prime brokerage. The figure illustrates (in EUR millions) the credit extended between four banks, banks A, B, C and D. Thus, Bank A has 100M credit with Bank B but no credit with bank C or D. Bank B has 100M credit with Banks A and C but no credit with Bank D. Bank C has 100M credit with both Banks B and D and Bank D only has 100M with Bank C.

Figure 4:
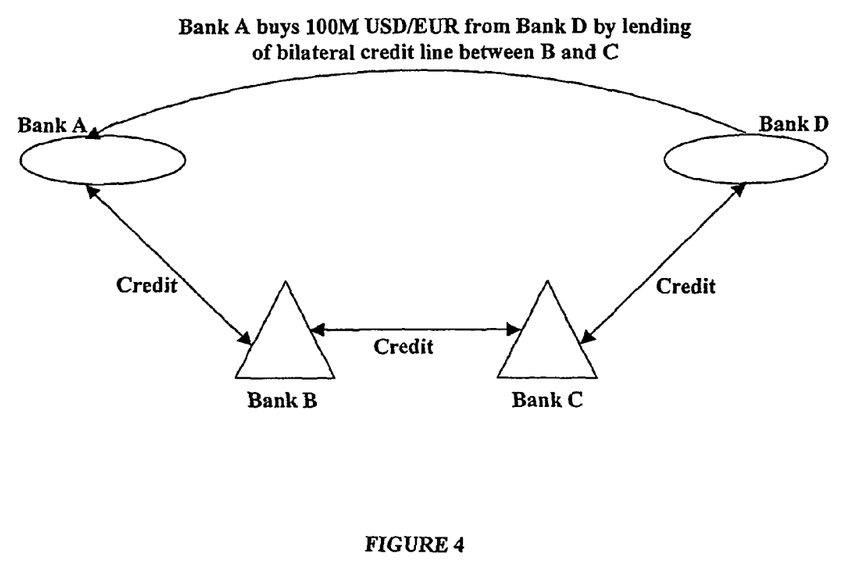
FIG. 4 shows how credit may be daisy chained to facilitate transactions between parties without direct bilateral credit.

If Bank A submits an order to buy 100 USD/EUR at up to 1.3840, and Bank D submits an order to sell 100 USD/EUR down to 1.3830, the matching engine will not make a match as there is no bilateral credit between A and D. However, Bank A has credit with Bank B, Bank B has credit with Bank C and Bank C has credit with Bank D. Banks B and C can provide their credit to allow the match to be made. In effect, the match is between A and B, B and C, and C and D. Credit is thus daisy chained to maximise the volume transacted. In return, prime broker banks receive a commission for allowing their credit to be used. The chain is illustrated in FIG. 4.

Figure 5:
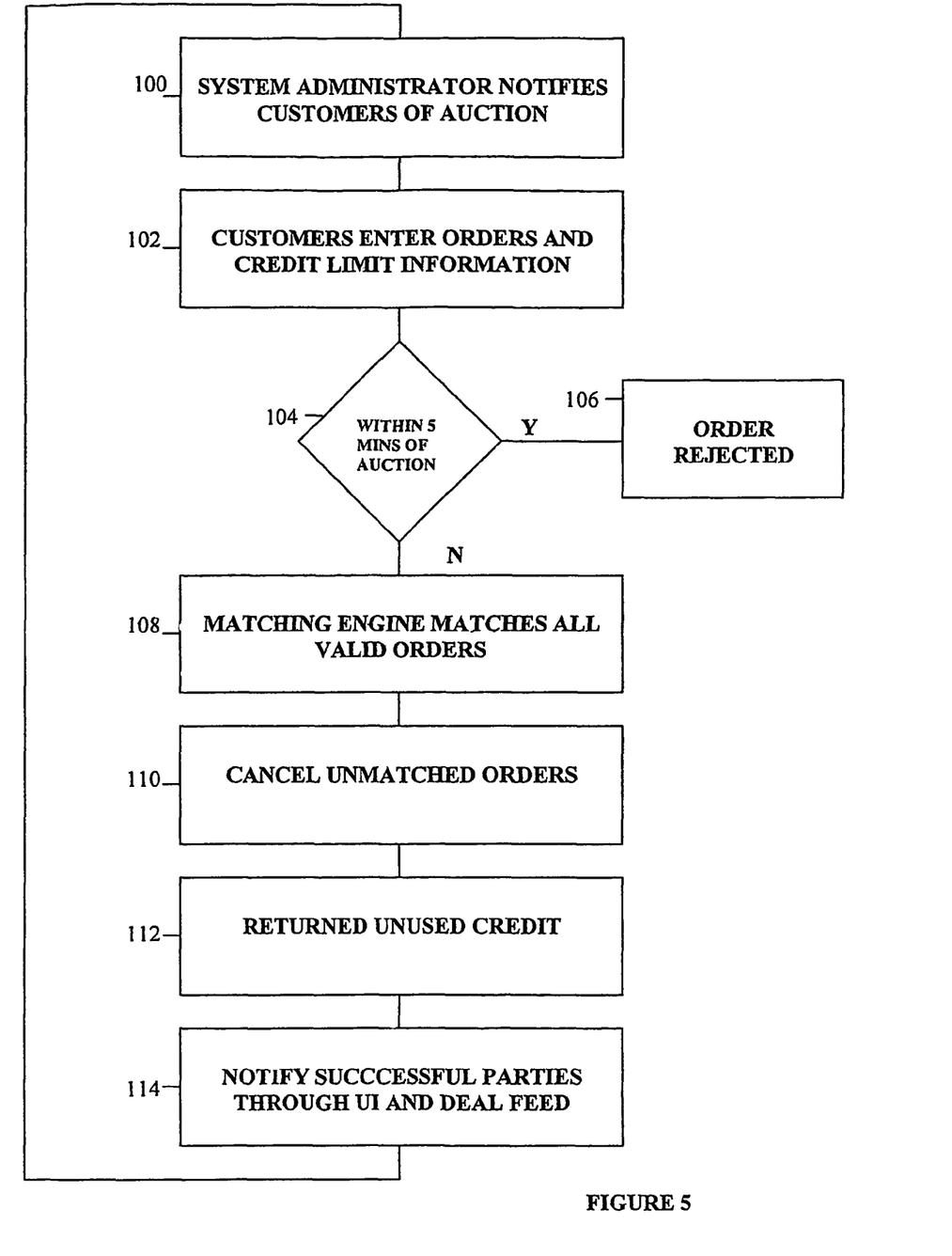
FIG. 5 is a flow chart of the auction process.

FIG. 5 shows a flow chart of the auction process. At step 100, the system administrator broadcasts to customers details of an auction to be held, including the instrument to be auctioned, the minimum order amount and the time of the auction. At step 102 customers enter, via their user interfaces, orders and credit limits, where these limits are not automatically renewed. These credit limits may include a willingness to act as or through a prime broker and the appropriate limits for such transactions. The system checks at 104 whether the orders and limits have been submitted 1 minute or more before the auction. If they have not, they are out of time and rejected at 106. At 108, the matching engine matches all valid orders and at 110 all unmatched orders are cancelled. At 112 all unused credit is returned to the customers. At step 114 successful parties are notified via their user interfaces and, if appropriate, their deal feed clients through the deal feed server. The process is then repeated for the next auction.

The embodiment of the invention described is useful to dealers needing to fulfil large customer orders, to proprietary dealers needing to square positions at the end of a trading day, to funds and large corporates wanting to use the credit pool on the system to conduct transactions more economically and to institutions wishing to earn fees by acting as prime brokers. Broker fees are reduced as the deal size is much bigger so there are less deals. Unlike existing anonymous systems, the existence of large orders in the market is not detectable by other parties and so prices are not negatively affected.

Most importantly, participants only allocate credit to the system for a short time before the auction and are notified of the outcome of the auction shortly after the auction. This allows unutilised credit to be unreserved so customers can quickly reserve that credit for other trading operations and so maximise their trading opportunities.

To a bank's customers, embodiments of the invention offer better prices as there is access to a large liquidity pool. As there is a defined time for order execution, customers benefit from knowing quickly whether their orders have been completed. Moreover customers are certain that they will remain anonymous to all but those parties with whom they have traded.

The embodiment described conducts auctions on the basis of limit orders entered by participants. In one variation of the system and method, the system may be used to permit traders to trade at a defined benchmark price. Benchmarks are used in the industry to define a reliable reference for the instrument being traded at intervals throughout the trading day. Orders can be input to transact at particular benchmark fixings and can be matched instantly as price is not a variable; the only variable is bilateral credit. Traders may cancel orders at any time up to a cut-off time as discussed above. In this case, the cut-off is the benchmark fixing time rather than an auction time. Orders are entered into the system only with an amount and a reference to the benchmark fixing at which the trader wants to trade. The order can be filled prior to the time at which the benchmark is fixed, at which point the trade takes place.

This variation has the advantage of overcoming any uncertainty that the limit order based system described above may provide. As traders do not know whether they have an open position until after the auction, there may be a rush to the market to cover open positions when the auction results are known. Dealing at a benchmark rate avoids the uncertainty of the limit order embodiment and prevents liquidity being channelled to certain points in the day.

Various other modifications to the embodiments described are possible and will occur to those skilled in the art without departing from the scope of the invention which is defined by the following claims.

The invention claimed is:

1. A method of trading a fungible instrument on a system comprising a plurality of computers connected on a network, the computers co-operating together to perform a method comprising:
   one or more computers of the system notifying time of an auction;
   one or more computers of the system receiving from participants of the auction orders related to the auction;
   one or more computers of the system receiving from the participants credit limits for execution of orders input by the participants;
   one or more computers of the system conducting the auction at the time of the auction by matching the orders received;
   one or more computers of the system notifying, after completion of the auction, the participants of their orders matched during the auction; and
   one or more computers of the system notifying, after completion of the auction, the participants of their auction-specific credit that was allocated to the auction but which was not used in their orders matched during the auction.

2. The method according to claim 1, wherein orders are matched on the basis of credit and price.

3. The method according to claim 1, wherein orders received less than a predetermined time before the auction are not accepted by the system.

4. The method according to claim 1, wherein credit limit allocations received less than a predetermined time before the auction are not accepted by the system.

5. The method according to claim 1, wherein participants are notified of unused credit immediately after the auction is completed.

6. The method according to claim 5, wherein said participants are notified of unused credit within one minute of completion of the auction.

7. The method according to claim 1, wherein the system notifying of an auction time further includes one or more computers of the system notifying participants of one or more instruments to be auctioned and the minimum order amount.

8. The method according to claim 1, comprising one or more computers of the system automatically renewing a participant's credit limits for future auctions on request from that participant.

9. The method according to claim 1, comprising one or more computers of the system receiving from participants credit limits for use in matching orders between other participants lacking bilateral credit.

10. The method according to claim 9, comprising one or more computers of the system receiving from participants an identification of other participants whose credit limits may be used to match orders entered by the participants.

11. The method according to claim 9, wherein conducting the auction comprises one or more computers of the system matching orders received from participants who do not have bilateral credit, the one or more computers of the system using the credit of an intermediary having bilateral credit with the participants submitting the matched orders.

12. The method according to claim 11, wherein the intermediary comprises a single participant.

13. The method according to claim 11, wherein the intermediary comprises a chain of intermediary parties each party in the chain having bilateral credit with adjacent parties in the chain, a first of said chain of intermediary parties having bilateral credit with the participant submitting one side of the matched order and a second of said chain of intermediary parties having bilateral credit with the participant submitting the other side of the matched order.

14. A method of anonymous computerised trading of fungible instruments, the method comprising:
   sending an electronic message notifying time of an auction;
   receiving at a computerised trading system, electronic messages from participants of the auction including orders related to the auction;
   receiving at the computerised trading system, electronic messages including participant credit limits for execution on the computerised trading system of orders input by the participants;
   conducting by the computerised trading system the auction at the time of the auction by matching the orders received;
   notifying, after completion of the auction, the participants of their orders matched during the auction, by sending electronic messages to the participants; and
   sending an electronic message to participants who had submitted credit limits notifying those participants of their auction-specific credit that was allocated to the auction but which was not used in their orders matched during the auction.

15. The method according to claim 14, wherein said matching is performed on the basis of price and bilateral credit between participants.

16. The method according to claim 14, wherein the auction notification is sent by a system administrator and includes the type of instrument to be auctioned and the minimum order size.

17. The method according to claim 14, the participants' credit limit messages comprise automatic renewals of credit limits submitted to the system for a previous auction.

18. The method according to claim 14, wherein the notification of matched order messages are sent to a participant deal feed client via a deal feed server.

19. The method according to claim 14, wherein the orders submitted to the system are limit orders.

20. The method according to claim 14, wherein the notification of unused credit message is sent to participants a time after conclusion of the auction.

21. The method according to claim 20, wherein the time is a minute or less.

22. The method according to claim 14, comprising, prior to the auction, receiving from participants electronic messages at the computerised trading system notifying the system of credit limits for use in providing bilateral credit for trades between third parties where no bilateral credit exists between the third parties.

23. A computerised trading system for anonymous trading of fungible instruments comprising:
   an auction administrator configured to send electronic messages notifying time of an auction; and receive from participants of the auction electronic order messages related to the auction, and electronic credit limit messages setting credit limits for trades on the computerised trading system by the participants;
   a store storing the orders and credit limits received from the participants;
   a matching engine configured to conduct at the computerised trading system the auction at the time of the auction by matching the orders received;
   a deal notifier configured to notify, after completion of the auction, the participants of their orders matched during the auction, by sending electronic messages to the participants; and
   a credit notifier configured to send, after completion of the auction, electronic messages to participants who had submitted credit limits notifying those participants of their auction-specific credit that was allocated to the auction but which was not used in their orders matched during the auction.

24. The system according to claim 23, wherein the deal notifier comprises a deal feed server.

25. The system according to claim 23, wherein the auction administrator includes a message broadcaster, configured to broadcast the auction time, the type of instrument to be auctioned and the minimum order size.

26. The system according to claim 23, wherein the credit limit messages sent by one or more trader terminals comprise instructions to the trading system to automatically renew credit limits submitted to the system for a previous auction.

27. The system according to claim 23, wherein the orders submitted to the system are limit orders.

28. The system according to claim 23, wherein the credit notifier sends notification of unused credit messages to participants a time after conclusion of the auction.

29. The system according to claim 28, wherein the time is a minute or less.

30. The system according to claim 23, wherein the messages received from participants include a notification to the trading system of prime broker credit limits for use in providing bilateral credit for trades between third parties where no bilateral credit exists between the third parties, wherein the system comprises a store for prime broker credit limits, and wherein the matching engine matches orders on the basis of prime broker credit where the prime broker has bilateral credit with both parties but there is no bilateral credit between the parties.

31. The system according to claim 30, wherein the prime broker credit limit store stores credit limits from a plurality of participants and the matching engine matches orders between participants using credit from a chain of two or more prime brokers, a first of said having bilateral credit with the participant submitting one side of the matched order and a second of said chain having bilateral credit with the participant submitting the other side of the matched order.

32. A non-transitory computer readable medium for trading a fungible instrument having program code stored thereon which, when run on a computer, causes the computer to perform the method of:
   notifying time of an auction;
   receiving from participants of the auction orders related to the auction;
   receiving from the participants credit limits for execution of orders input by the participants
   conducting the auction at the time of the auction by matching orders received;
   notifying, after completion of the auction, the participants of their orders matched during the auction; and
   notifying, after completion of the auction, the participants of their auction-specific credit that was allocated to the auction but which was not used in their orders matched during the auction.

33. The non-transitory computer readable medium according to claim 32, wherein the program code causes orders received less than a predetermined time before the auction to be rejected by the system.

34. The non-transitory computer readable medium according to claim 32, wherein the program code causes credit limit allocations received less than a predetermined time before the auction to be rejected by the system.

35. The non-transitory computer readable medium according to claim 32, wherein the program code causes participants to be notified of unused credit immediately after the auction is completed.

36. The non-transitory computer readable medium according to claim 32, wherein said program code causes the participants to be notified of unused credit within one minute of completion of the auction.

37. The non-transitory computer readable medium according to claim 32, wherein the program code for causing notification of an auction time further includes code for notifying participants of the instrument to be auctioned and the minimum order amount.

38. The non-transitory computer readable medium according to claim 32, comprising program code for automatically renewing a participant's credit limits for future auctions on request from that participant.

39. The non-transitory computer readable medium according to claim 32, comprising program code receiving from participant's credit limits for use in matching orders between other participants lacking bilateral credit.

40. The non-transitory computer readable medium according to claim 39, comprising program code for receiving from participants an identification of other participants whose credit limits may be used to match orders entered by the participants.

41. The non-transitory computer readable medium according to claim 39, wherein conducting the auction comprises matching orders received from participants who do not have bilateral credit, using the credit of an intermediary having bilateral credit with the participants submitting the matched orders.

42. The non-transitory computer readable medium according to claim 41, wherein the intermediary comprises a single participant.

43. The non-transitory computer readable medium according to claim 41, wherein the intermediary comprises a chain of intermediary parties each party in the chain having bilateral credit with adjacent parties in the chain, a first of said chain of intermediary parties having bilateral credit with the participant submitting one side of the matched order and a second of said chain of intermediary parties having bilateral credit with the participant submitting the other side of the matched order.

* * * * *